(No Model.)

G. BURDICK.
COMBINED CONE LOCK NUT AND DUST CAP FOR CRANK SHAFTS.

No. 593,873.  Patented Nov. 16, 1897.

WITNESSES:
Fred Einfeldt
A L Jackson

INVENTOR
George Burdick
BY J.C. Sturgeon
ATTORNEY

UNITED STATES PATENT OFFICE.

GEORGE BURDICK, OF ERIE, PENNSYLVANIA, ASSIGNOR TO THE PENN MANUFACTURING COMPANY, OF SAME PLACE.

COMBINED CONE LOCK-NUT AND DUST-CAP FOR CRANK-SHAFTS.

SPECIFICATION forming part of Letters Patent No. 593,873, dated November 16, 1897.

Application filed September 4, 1896. Serial No. 604,829. (No model.)

*To all whom it may concern:*

Be it known that I, GEORGE BURDICK, a citizen of the United States, residing at the city of Erie, in the county of Erie and State of Pennsylvania, have invented certain new and useful Improvements in a Combined Cone Lock-Nut and Dust-Cap for Bicycle Crank-Shafts; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in combined cone lock-nuts and dust-caps for bicycle crank-shafts; and it consists in making the cone lock-nut with a web and flange, so that when screwed up against the cone it will cover and inclose the ends of the cone and also the end of the ball-cup, together with an annular ring of felt or other suitable packing, so as to thoroughly exclude dust and dirt from the bearing.

This invention is illustrated in the accompanying drawings, in which—

Figure 1:
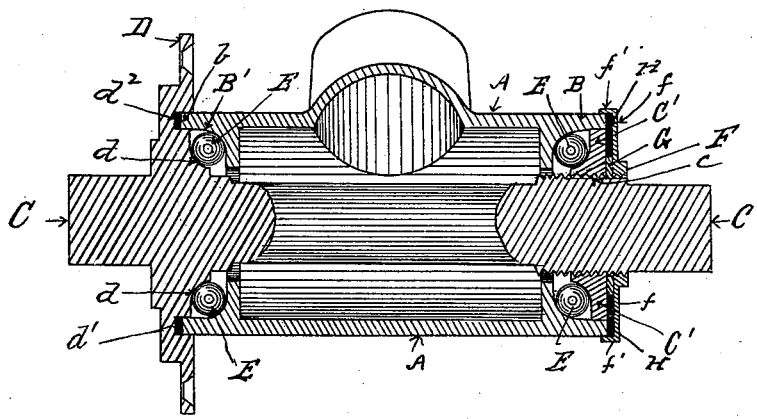
Figure 2:
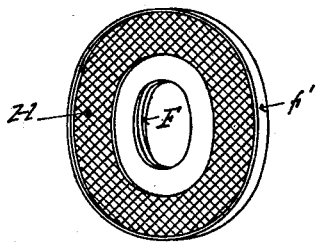

Figure 1 is a longitudinal section of a bicycle crank-shaft-bearing embodying said invention. Fig. 2 is a perspective view of my improved combined lock-nut and dust-cap with the packing-ring therein.

In the drawings, A is the shell of the bearing, B B' the ball-bearing cups in the ends thereof, and C the crank-shaft, provided at one end with a flange D, adapted to receive a sprocket-wheel, and also having a fixed ball-bearing cone $d$, adapted to retain the balls E in the cup B'. In the inner face of the flange D there is also, preferably, a groove $d'$, adapted to receive a packing-ring $d^2$ and also the end $b$ of the ball-cup B', so as to form a dust and dirt proof joint therewith. The opposite end of the shaft C is screw-threaded at $c$ and provided with an internally-screw-threaded ball-bearing cone C', adapted to be screwed upon the screw-threaded portion $c$ of the shaft C, so that it can be adjusted in and out thereon. On the outer end of the screw-threaded portion $c$ of the shaft C is a cone lock-nut F, Fig. 2, which is adapted to be screwed up firmly against a loose washer G, placed thereon against the end of the ball-cone C', so as to firmly lock the cone C' in place. This lock-nut F is provided with a radial web $f$, which extends outward, so as to cover the ends of the cone C' and the cone-cup B, where it is provided with an inwardly-projecting annular flange $f'$, which embraces the periphery of the end of the ball-cup B, and on the inner face of the web $f$ I place a ring H, of felt or other suitable packing, of approximately the same thickness as the washer G, which is held in contact with the ends of the cone C' and of the ball-cup B by the web $f$ and flange $f'$ of the lock-nut F, so that it completely covers and incloses the joint between the cone C' and the end of the ball-cup B and excludes all dust and dirt therefrom.

Having thus fully described my invention, so as to enable others to construct and use the same, what I claim as new, and desire to secure by Letters Patent of the United States, is—

In a crank-shaft bearing, the combination, with a shell having a cup at one end, of a shaft, a cone C' screwed on the said shaft and slidable inside the mouth of the said cup, balls between the said cup and cone, a metallic washer on the shaft, a washer H of flexible material surrounding the said metallic washer and covering the joint between the shell and the cup, and a lock-nut screwed on the said shaft and provided with a web $f$ bearing against the washer H, and a flange $f'$ inclosing the end portion of the said shell, substantially as set forth.

In testimony whereof I affix my signature in presence of two witnesses.

GEORGE BURDICK.

Witnesses:
FRED EINFELDT,
H. J. CURTZE.